Oct. 1, 1929.  F. W. MILBOURN  1,729,957

OPERATING MECHANISM FOR VENEER CUTTING LATHES

Filed Sept. 6, 1927  2 Sheets-Sheet 1

Inventor
Frank W Milbourn
Kwis Hudson & Kent
attys

Oct. 1, 1929.　　F. W. MILBOURN　　1,729,957
OPERATING MECHANISM FOR VENEER CUTTING LATHES
Filed Sept. 6, 1927　　2 Sheets-Sheet 2

Inventor:
Frank W Milbourn
Kwin Hudson & Kent
attys

Patented Oct. 1, 1929

1,729,957

UNITED STATES PATENT OFFICE

FRANK W. MILBOURN, OF PAINESVILLE, OHIO, ASSIGNOR TO THE COE MANUFACTURING COMPANY, OF PAINESVILLE, OHIO, A CORPORATION OF OHIO

OPERATING MECHANISM FOR VENEER-CUTTING LATHES

Application filed September 6, 1927. Serial No. 217,583.

The present invention relates to a lathe for cutting veneer, and more particularly the invention relates to a veneer lathe which is motor driven and provided with mechanism whereby the drive shaft will be immediately stopped without overrunning, when the circuit energizing the driving motor is opened.

The invention further relates to automatic mechanism for stopping the driving motor, and consequently the cutting action of the lathe, when the slide which carries the cutting knife has reached any desired limit of its movement in the cutting operation.

Reference should be had to the accompanying drawings forming a part of this specification, in which Figure 1 is a perspective view showing a veneer cutting lathe.

Figure 1:
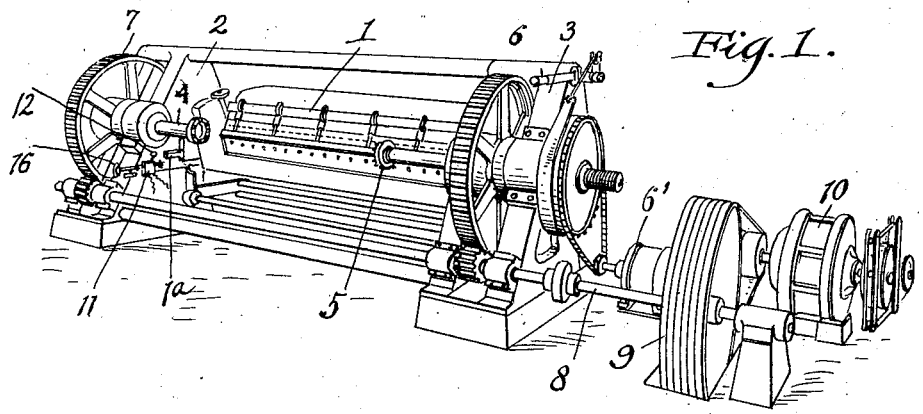

In the present specification the complete construction of the veneer cutting lathe is not disclosed nor will it be described, because such a lathe in its essential features of bed plate, dogging mechanism, knife slide and operating mechanism, therefor as well as the general motor drive, are at present well known and in use on lathes that are now openly on the market. Only such of the lathe parts and mechanism are shown as are necessary in order to describe the present invention.

The knife carriage mechanism is indicated at 1, and is mounted on suitable ways or guides carried by the end members 2 and 3 of the lathe structure. The operating mechanism for moving the carriage forward in its cutting operation is of the type well known in the art where the carriage is fed forward during the entire cutting operation.

The spindles for holding the log to be cut are indicated at 4 and 5, these spindles being operated by suitable motive power for moving them in or out, one of such mechanisms being indicated at 6' and comprising an electric motor.

The mechanism for turning the log comprises the gears 6 and 7, which are in turn driven by a power shaft 8, which, as herein shown, has a pulley 9 thereon, and the power is supplied to the pulley by means of an electric motor 10.

The mechanism for moving the knife carriage 1 is connected so as to be driven from the gears 6 and 7, so that the main drive shaft 8 supplies power for driving or turning the log, as well as for moving the slide forward during its cutting operation.

Suitable switches for operating the motors, and particularly the motor 10, are provided which are not shown, except they are diagrammatically indicated in Figure 4, as will later be explained.

Preferably mounted upon one of the end frames of the veneer lathe is a switching mechanism contained within a casing 11. This switching mechanism may be of any desired type, and the operative or movable part of the switch extends outside of the casing, and is indicated by the reference numeral 12. The forward movement of the carriage will occasion the operation of the switch when the carriage has moved to a predetermined position in the forward movement thereof. In other words, the portion $1^a$ of the carriage will engage with the movable member 12 of the switch mechanism and move the same to off position. This will, as will be later explained, cause the circuit supplying the driving motor to be opened and so will stop the forward movement of the knife carriage.

Figure 2:
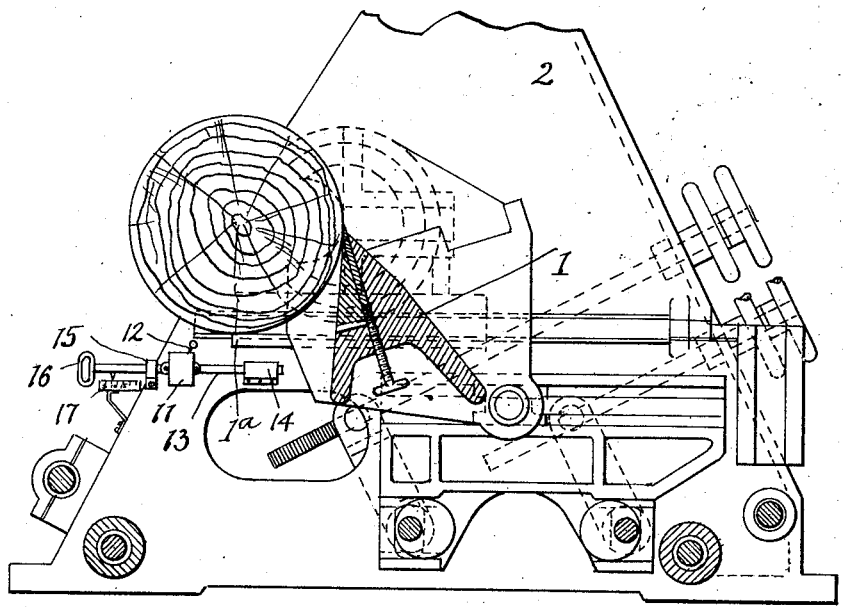
Figure 2 is a sectional elevation with many parts omitted for the sake of clearness.

In order to adjust the position of the switch with respect to the carriage, switching mechanism is mounted on a movable member 13, which member is mounted in guides 14 and 15, so that by the operator taking hold of the handle 16 and moving the member 13, the position of the switch box may be adjusted. For the purposes of indicating the adjustment or position of the switch box with respect to the forward movement of the knife carriage, a scale 17 is provided, which cooperates with a pointer on the member 13, as clearly shown in Figure 2.

Cooperating with the shaft of the motor 10 is mechanism for applying a brake thereto when the electric circuit supplying the motor is opened.

The mechanism which is herein briefly shown and described is a mechanism which is well known and used, and inasmuch as no claim is laid to invention therein, sufficient description only is given that the operation may be understood.

It should also be stated that the braking mechanism which is herein shown is only indicative of other forms of mechanism which may be used with equal facility, which operate to apply a brake when the circuit energizing the driving motor is open.

Figure 3:
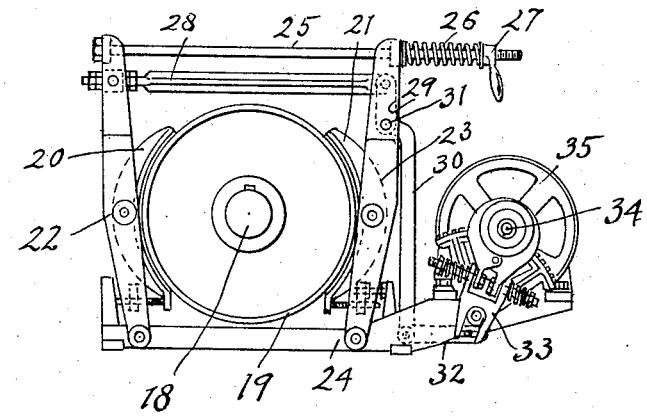
Figure 3 is a more or less diagrammatic elevation of the stop mechanism.

Referring to Figure 3, the motor shaft is indicated at 18, and upon this shaft there is keyed a drum 19. Cooperating with the drum are shoes 20 and 21, which shoes are pivotally mounted upon levers 22 and 23. These levers are pivoted upon a base portion 24, and at their upper ends are normally drawn together by means of a rod 25 with a spring 26 surrounding the rod and acting against the lever 23 and an adjustable nut 27 which is upon a threaded portion of the rod 25. Therefore, the normal position of the brake shoes 20 and 21 is in contact with the brake drum.

Connected at one end to the lever 22 is a member or rod 28. This rod 28 is pivotally connected to an arm 29 of a lever 30. The lever 30 is pivotally mounted upon the lever 23 at the point 31. This lever 30 at its lower end is connected with a lever 32 which has an articulated connection with an arm 33. This arm 33 is mounted upon a shaft 34, upon which shaft is mounted an armature or magnet within a field winding, the cooperating parts in effect forming a motor. These parts without further description are indicated by the reference numeral 35.

The electrical connection is such as will be later explained, that when the circuit to the driving motor 10 is closed the circuit to the field winding mechanism, just described, is also energized, causing a rotation of the shaft 34, which in turn moves the arm 33 in a counter-clockwise direction, and this movement is communicated to the levers 30 and 28, thereby causing the members 22 and 23 to be spread apart against the action of the spring 26. This action will cause the brake shoes 20 and 21 to be taken off of the drum 19. So long as the circuit which energizes the motor 10 is closed the brake shoes 20 and 21 will be held out of contact with the brake drum 19 and the shaft of the motor will be free to turn. However, as soon as the circuit energizing the motor 10 is opened it will also open the circuit to the torque motor which operates the brake mechanism, thereupon the spring 26 will cause the brake shoes 20 and 21 to impinge upon the brake drum 19 and thereupon immediately arrest rotation of the motor shaft 18.

Therefore, it will be seen that the turning movement of the shaft of the motor 10 is immediately arrested when the current supplied to the motor is broken.

Figure 4:
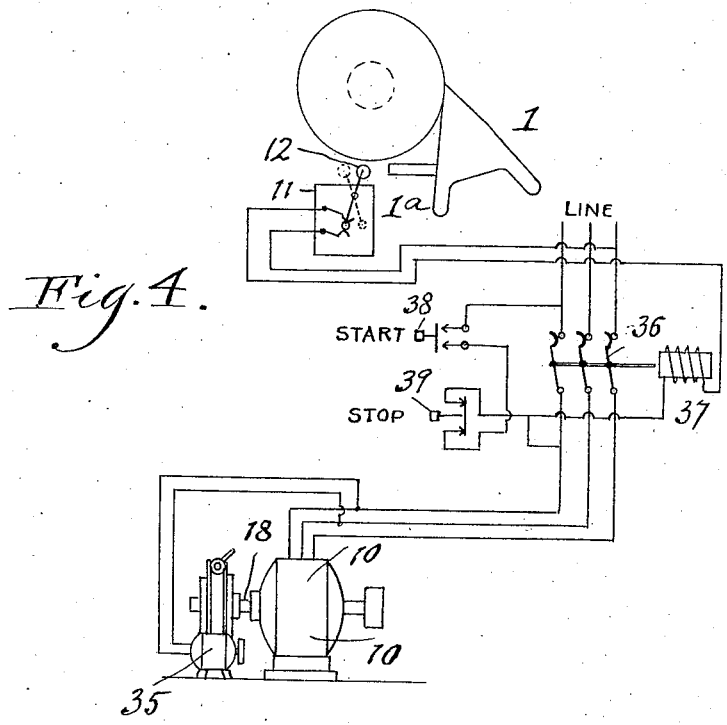
Figure 4 is a wiring diagram showing the operation of the electrically operated instrumentalities.

Referring to Figure 4, the parts which have already been described are indicated therein. The electric circuit there shown is a three phase circuit, having a switch 36 for opening and closing the circuit which is operated by an electro-magnet 37 in a way which is well known in the art, as there are numerous commercial switches operating on the same principle.

An electric switch for starting and stopping the motor 10 is conventionally shown, in which the starting button is represented at 38 and the stop button is represented at 39.

The starting and stopping switch is electrically connected with the power circuit, as indicated in the drawings, whereby when the starting button is depressed the switch 36 is moved to closed position, whereupon the circuit to the motor 10 is closed, causing it to operate, and simultaneously the circuit to the torque motor 35 is closed, thereby moving the brake shoes out of contact with the drum 19. When the motor is running and the stop button 39 is pushed it causes operation of the solenoid 37 to open the switch 36, thereby shutting off current to the motor 10 as well as to the torque motor 35, whereupon the brake shoes are immediately applied to the brake drum and the motor shaft is prevented from overrunning.

The switch 12 is connected to the electric circuit in the manner indicated in Figure 4, and, as will be appreciated, its normal position is that shown in full lines in the figure. In other words, the switch is in closed position under normal operating conditions. The switch will be moved to its closed position in starting the lathe in its operation upon a log. Assuming that the switch 36 is closed and that the knife carriage is feeding inwardly in its cutting operation, eventually the portion 1ª will contact with the switch 12, moving it to its open or dotted line position. This will immediately deenergize the magnet 37 moving the switch to open position, and so cut off the supply of current to the motor 10, with the consequent result of bringing the motor shaft to an immediate stop and with no overrunning.

The provision of the switch cooperating with the moving knife carriage, in a veneer lathe, is important in that without attention from the operator the driving mechanism of the lathe will automatically be stopped, when, in the operation of cutting veneer from the log, the maximum amount of veneer has been removed from the log, and where further operation would bring the knife blade into contact with the dogs or spindles which hold the log.

It is also very important that the driving mechanism which, as before stated simultaneously turns the log and moves the knife carrier, should be capable of stopping instantly when the current to the driving mechanism is turned off. It frequently happens in the cutting of veneer that nails or similar foreign substances are embedded in the wood, and if continued operation of the veneer lathe is permitted these foreign substances will engage with the knife and necessitate its removal and regrinding. It often happens that the operator only discovers the presence of this foreign material just ahead of its engagement with the cutting member, and although he may quickly open the circuit to the operating motor, even a moderate overrunning of the mechanism would bring the foreign substance into contact with the cutting knife.

By the invention herein described it is possible to stop the turning of the log and the feeding of the knife immediately upon the opening of the energizing circuit for the driving motor, and hence damage to the cutting knife from causes above indicated may be readily obviated.

Having thus described my invention what I claim as new is:

1. In a veneer lathe, a knife carriage, means for supporting a log, a common driving means for the log and knife carriage, operating means for energizing the driving means, a brake mechanism associated with the operating means and normally exercising a braking effect upon the operating means, the said brake mechanism and the operating means being related so that when the operating means is in operation the braking means is ineffective, and vice versa.

2. In a veneer lathe, a knife carriage, means for supporting a log, a common driving means for the log and the knife carriage, an electric motor for operating the said driving means, an electrically operated brake associated with the motor shaft, the said brake being operable when the current to the motor is shut off.

3. In a veneer lathe, a knife carriage, means for supporting a log, a common driving means for the log and the carriage, an electric motor for operating the said driving means, an electrically operated brake associated with the motor shaft, the said brake being operated when the current to the motor is shut off, a movable switch member in the path of movement of the knife carriage, said switch being electrically connected with the motor, whereby the motor is deenergized when the carriage contacts with the switch.

4. In a veneer lathe, a knife carriage, means for supporting a log, a common driving means for the log and the knife carriage, an electric motor for operating the said driving means, an electrically operated brake associated with the motor shaft, the said brake being operable when the current to the motor is shut off, a switch mechanism adjustably mounted with respect to the knife carriage, said carriage engaging with the switch mechanism at a predetermined position to thereby deenergize the driving motor.

5. In a veneer lathe, a knife carriage, means for supporting a log, a common driving means for the log and the carriage, an electric motor for operating the said driving means, brake mechanism associated with the shaft of the motor, electrically operated mechanism for normally holding the brake mechanism out of braking position when said mechanism is electrically energized, the said mechanism being electrically connected with the motor whereby when the motor is energized the electrical mechanism is energized, and vice versa.

In testimony whereof, I hereunto affix my signature.

FRANK W. MILBOURN.